US009555367B2

(12) United States Patent
Masel et al.

(10) Patent No.: US 9,555,367 B2
(45) Date of Patent: Jan. 31, 2017

(54) ELECTROCATALYTIC PROCESS FOR CARBON DIOXIDE CONVERSION (71) Applicant: Dioxide Materials, Inc., Champaign, IL (US)

(72) Inventors: Richard I. Masel, Champaign, IL (US); Amin Salehi-Khojin, Champaign, IL (US)

(73) Assignee: Dioxide Materials, Inc., Boca Raton, FL (US)

( * ) Notice: Subject to any disclaimer, the term of this patent is extended or adjusted under 35 U.S.C. 154(b) by 103 days.

(21) Appl. No.: 14/684,145

(22) Filed: Apr. 10, 2015

(65) Prior Publication Data
US 2015/0209722 A1    Jul. 30, 2015

Related U.S. Application Data (60) Division of application No. 13/445,887, filed on Apr. 12, 2012, now Pat. No. 9,012,345, which is a
(Continued)

(51) Int. Cl.
*B01J 37/34* (2006.01)
*B01J 23/00* (2006.01)
(Continued)

(52) U.S. Cl.
CPC .......... *B01D 53/326* (2013.01); *B01J 31/0202* (2013.01); *B01J 31/0275* (2013.01);
(Continued)

(58) Field of Classification Search
USPC ........................................... 502/5, 100, 150
See application file for complete search history.

(56) References Cited

U.S. PATENT DOCUMENTS 1,919,850 A    7/1922   Luscher
2,511,198 A    6/1950   Engel
(Continued)

FOREIGN PATENT DOCUMENTS

CA    1272180 A     7/1990
CA    2821642 A1    6/2012
(Continued)

OTHER PUBLICATIONS

Chu et al., "Fixation of CO2 by Electrocatalytic Reduction and Electropolymerization in Ionic Liquid-H2O Solution", ChemSusChem 1 (2008), pp. 205-209.
(Continued)

*Primary Examiner* — James McDonough
(74) *Attorney, Agent, or Firm* — Corridor Law Group, P.C.

(57) ABSTRACT

An electrocatalytic process for carbon dioxide conversion includes combining a Catalytically Active Element and Helper Catalyst in the presence of carbon dioxide, allowing a reaction to proceed to produce a reaction product, and applying electrical energy to said reaction to achieve electrochemical conversion of said reactant to said reaction product. The Catalytically Active Element can be a metal in the form of supported or unsupported particles or flakes with an average size between 0.6 nm and 100 nm. the reaction products comprise at least one of CO, $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$, $(COO^-)_2$, and $CF_3COOH$.

8 Claims, 4 Drawing Sheets

Related U.S. Application Data continuation-in-part of application No. 12/830,338, filed on Jul. 4, 2010, now abandoned.

(60) Provisional application No. 61/317,955, filed on Mar. 26, 2010.

(51) Int. Cl.
  *B01J 25/00* (2006.01)
  *B01J 29/00* (2006.01)
  *B01J 31/00* (2006.01)
  *B01D 53/32* (2006.01)
  *B01J 31/02* (2006.01)
  *C25B 3/04* (2006.01)
  *C25B 1/00* (2006.01)
  *C25B 15/02* (2006.01)

(52) U.S. Cl.
  CPC ....... *B01J 31/0279* (2013.01); *B01J 31/0284* (2013.01); *B01J 31/0285* (2013.01); *B01J 31/0292* (2013.01); *B01J 31/0298* (2013.01); *C25B 1/00* (2013.01); *C25B 3/04* (2013.01); *C25B 15/02* (2013.01); *B01J 2231/625* (2013.01)

(56) References Cited

U.S. PATENT DOCUMENTS

| | | |
|---|---|---|
| 2,996,359 A | 8/1961 | Mossman et al. |
| 3,959,094 A | 5/1976 | Steinberg |
| 4,207,151 A | 6/1980 | Franke |
| 4,240,882 A | 12/1980 | Ang |
| 4,315,753 A | 2/1982 | Bruckenstein et al. |
| 4,474,652 A | 10/1984 | Brown |
| 4,523,981 A | 6/1985 | Ang |
| 4,545,872 A | 10/1985 | Sammells |
| 4,595,465 A | 6/1986 | Ang |
| 4,608,132 A | 8/1986 | Sammells |
| 4,608,133 A * | 8/1986 | Morduchowitz ......... C25B 3/04 204/265 |
| 4,609,440 A | 9/1986 | Frese et al. |
| 4,609,441 A | 9/1986 | Frese |
| 4,620,906 A | 11/1986 | Ang |
| 4,668,349 A | 5/1987 | Cueller |
| 4,673,473 A | 6/1987 | Ang |
| 4,701,437 A * | 10/1987 | Boxhoorn ................ B01J 23/66 502/348 |
| 4,756,807 A | 7/1988 | Meyer |
| 4,771,708 A | 9/1988 | Douglass, Jr. |
| 4,789,442 A | 12/1988 | Nakagawa |
| 4,818,353 A | 4/1989 | Langer |
| 4,879,070 A | 11/1989 | Kent |
| 4,968,393 A | 11/1990 | Mazur et al. |
| 5,064,733 A | 11/1991 | Krist |
| 5,071,526 A | 12/1991 | Pletcher et al. |
| 5,089,661 A | 2/1992 | Maspero et al. |
| 5,206,433 A | 4/1993 | Hohenschutz |
| 5,284,563 A | 2/1994 | Fujihara |
| 5,294,740 A | 3/1994 | Kiefer |
| 5,334,759 A | 8/1994 | Lippert |
| 5,362,367 A | 11/1994 | Dapperheld et al. |
| 5,382,332 A | 1/1995 | Fujihira et al. |
| 5,639,910 A | 6/1997 | Ikariya |
| 5,709,789 A | 1/1998 | Shay |
| 5,763,622 A | 6/1998 | Podszun et al. |
| 5,804,045 A | 9/1998 | Orillion et al. |
| 5,879,915 A | 3/1999 | Loubiere |
| 5,928,806 A | 7/1999 | Olah |
| 5,952,540 A | 9/1999 | Lee et al. |
| 6,024,855 A | 2/2000 | Sharifan |
| 6,099,990 A | 8/2000 | Denton et al. |
| 6,429,333 B1 | 8/2002 | Saari |
| 6,660,680 B1 | 12/2003 | Hampden-Smith |
| 6,706,657 B2 * | 3/2004 | Commereuc ........ B01J 31/0284 502/162 |
| 6,713,649 B1 | 3/2004 | Hladly |
| 6,841,700 B2 | 1/2005 | Auer |
| 6,849,764 B2 | 2/2005 | Gurkaynak |
| 6,867,329 B2 | 3/2005 | Auer |
| 6,906,222 B2 | 6/2005 | Slany |
| 6,955,743 B2 | 10/2005 | Rousu |
| 6,987,134 B1 | 1/2006 | Gangon |
| 6,992,212 B2 | 1/2006 | Zehner |
| 7,081,547 B2 | 7/2006 | Fujimoto |
| 7,157,404 B1 | 1/2007 | Jun |
| 7,241,365 B2 | 7/2007 | Auer |
| 7,253,316 B2 | 8/2007 | Pastre |
| 7,323,593 B2 | 1/2008 | Adami |
| 7,351,860 B2 | 4/2008 | Adami |
| 7,420,088 B2 | 9/2008 | Karl |
| 7,459,590 B2 | 12/2008 | Olah |
| 7,479,570 B2 | 1/2009 | Ogo |
| 7,605,293 B2 | 10/2009 | Olah |
| 7,608,743 B2 | 10/2009 | Olah |
| 7,612,233 B2 | 11/2009 | Hauk |
| 7,618,725 B2 | 11/2009 | Masel |
| 7,704,369 B2 | 4/2010 | Olah |
| 8,313,634 B2 * | 11/2012 | Bocarsly ................... C25B 3/04 205/440 |
| 8,592,633 B2 | 11/2013 | Cole et al. |
| 2004/0031685 A1 | 2/2004 | Anderson et al. |
| 2004/0072683 A1 | 4/2004 | Kodas et al. |
| 2006/0096871 A1 | 5/2006 | Manoukian |
| 2006/0234174 A1 | 10/2006 | Burrahm et al. |
| 2006/0235091 A1 | 10/2006 | Olah |
| 2007/0036706 A1 | 2/2007 | Ogo |
| 2007/0045125 A1 | 3/2007 | Hartvigsen |
| 2007/0187247 A1 | 8/2007 | Lackner |
| 2008/0039538 A1 | 2/2008 | Olah |
| 2008/0103040 A1 | 5/2008 | Rodriguez et al. |
| 2008/0223727 A1 | 9/2008 | Oloman |
| 2009/0014336 A1 * | 1/2009 | Olah ..................... C07C 29/1518 205/450 |
| 2009/0016948 A1 | 1/2009 | Young |
| 2009/0169452 A1 | 7/2009 | Constantz |
| 2009/0289211 A1 | 11/2009 | Fujioka |
| 2010/0132556 A1 | 6/2010 | Constantz |
| 2010/0133120 A1 | 6/2010 | Varney et al. |
| 2010/0135865 A1 | 6/2010 | Constantz |
| 2010/0137457 A1 | 6/2010 | Kaplan |
| 2010/0187123 A1 | 7/2010 | Bokarsly |
| 2010/0193370 A1 | 8/2010 | Olah |
| 2010/0276287 A1 | 11/2010 | Manoukian et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0226632 A1 | 9/2011 | Cole et al. |
| 2011/0237830 A1 | 9/2011 | Masel |
| 2012/0308903 A1 * | 12/2012 | Masel ...................... C25B 3/00 429/409 |
| 2014/0378561 A1 | 12/2014 | Van Berchum et al. |

FOREIGN PATENT DOCUMENTS

| | | |
|---|---|---|
| DE | 183856 C | 1/1906 |
| EP | 0012215 A | 6/1980 |
| EP | 0293230 A | 11/1988 |
| EP | 0323300 A | 7/1989 |
| GB | 2230782 A | 10/1990 |
| JP | H04-013883 A | 5/1990 |
| JP | H10-017554 A | 1/1998 |
| JP | H20-517749 A | 5/2008 |
| JP | 2012017300 A | 1/2012 |
| WO | WO-2008110830 A1 | 9/2008 |
| WO | WO-2010007602 A1 | 1/2010 |
| WO | 2010/063624 A1 | 6/2010 |
| WO | WO-2010063626 A1 | 6/2010 |
| WO | WO-2011120021 A1 | 9/2011 |

(56) References Cited

FOREIGN PATENT DOCUMENTS

WO  WO-2012006240 A   1/2012
WO  WO-2013006711 A1  1/2013

OTHER PUBLICATIONS

Delacourt et al., "Design of an Electrochemical Cell Making Syngas (CO+H-2) from CO2 and H2O Reduction at Room Temperature", J. of the Electrochem. Soc. 155 (2008), pp. B42-B49.
Delacourt et al., "Mathematical Modeling of a Cation-Exchange Membrane Containing Two Cations", J. of the Electrochem. Soc. 155 (2008), pp. B1210-B1217.
Fukuzumi, "Bioinspired Energy Conversion Systems for Hydrogen Production and Storage", Eur. J. of Inorg. Chem. 2008 (2008), pp. 1351-1362.
Hori, "Electrochemical CO2 Reduction on Metal Electrodes", Modern Aspects of Electrochem. 42 (2008), pp. 89-189.
Ikeda et al., "Electrochemical Reduction of Carbon Dioxide Using Gas Diffusion Electrodes Loaded with Fine Catalysts", Nanoscience and Nanotechnology 1136 (2008), pp. 108-113.
Jiang et al., "Solvent-Free Synthesis of Substituted Ureas from CO2 and Amines with a Functional Ionic Liquid as the Catalyst", Green Chem. 10 (2008), pp. 465-469.
Kinge et al., "Dependence of CO Oxidation on Pt Nanoparticle Shape: A Shape-Selective Approach to the Synthesis of PEMFC Catalysts", Applied Organometallic Chem. 22 (2008), pp. 49-54.
Oloman et al., "Electrochemical Processing of Carbon Dioxide", ChemSusChem 1 (2008), pp. 385-391.
O'Mahony et al., "The Electrochemical Reduction of Hydrogen Sulfide on Platinum in Several Room Temperature Ionic Liquids", The J. of Phys. Chem. C 112 (2008), pp. 7725-7730.
Rezaei et al., "Effects of Tetrabutylammonium Hydrogen Sulfate as an Electrolyte Additive on the Electrochemical Behavior of Lead Acid Battery", J. of Solid State Electrochem. 12 (2008), pp. 1663-1671.
Scheijen et al., "The Electrooxidation of Small Organic Molecules on Platinum Nanoparticles Supported on Gold: Influence of Platinum Deposition Procedure", J. of Solid State Electrochem. 12 (2008), pp. 483-495.
Silvester et al., "Electrochemical Reduction of Benzoic Acid and Substituted Benzoic Acids in Some Room Temperature Ionic Liquids", The J. of Phys. Chem. C 112 (2008), pp. 12966-12973.
Solla-Gullon et al., "Shape-Dependent Electrocatalysis: Methanol and Formic Acid Electrooxidation on Preferentially Oriented Pt Nanoparticles", Phys. Chem. Chem. Phys. 10 (2008), pp. 3689-3698.
Sun et al., "Hydroxyl-Functionalized Ionic Liquid: A Novel Efficient Catalyst for Chemical Fixation of CO2 to Cyclic Carbonate", Tetrahedron Lett. 49 (2008), pp. 3588-3591.
Tian et al., "Platinum Metal Catalysts of High-Index Surfaces: From Single-Crystal Planes to Electrochemically Shape-Controlled Nanoparticles", J. of Phys. Chem. C 112 (2008), pp. 19801-19817.
Wong et al., "A Robust Ionic Liquid as Reaction Medium and Efficient Organocatalyst for Carbon Dioxide Fixation", ChemSusChem 1 (2008), pp. 67-70.
Yang et al., "Electrodeposition of Tin and Antimony in 1-Ethyl-3-Methylimidazolium Tetrafluoroborate Ionic Liquid", J. Appl. Electrochem 38 (2008), 537-542.
Zhang et al., "Electrochemical Activation of CO2 in Ionic Liquid (BMIMBF4): Synthesis of Organic Carbonates Under Mild Conditions", Green Chem. 10 (2008), pp. 202-206.
Zhang et al., "Hydrogenation of Carbon Dioxide is Promoted by a Task-Specific Ionic Liquid", Angewandte. Chem. Int. Ed. 47 (2008), pp. 1127-1129.
Barrosse-Antle et al., "Reduction of Carbon Dioxide in 1-Butyl-3-Methylimidazolium Acetate", Chem. Commun. (2009), pp. 3744-3746.
Cheung et al., "Electrocatalytic Reduction of Carbon Dioxide by a Polymeric Film of Rhenium Tricarbonyl Dipyridylamine;", J. of Organometallic Chem. 694 (2009), pp. 2842-2845.
Haerens et al., "Electrochemical Decomposition of Choline Chloride Based Ionic Liquid Analogues", Green Chem. 11 (2009), pp. 1357-1365.
Ikeda et al., "Electrochemical Reduction of Carbon Dioxide Using Gas Diffusion Electrodes Loaded With Fine Catalysts AIP Conference Proceedings", Nanoscience and Nanotechnology 1136 (2009), pp. 108-113.
Innocent et al., "Electro-Reduction of Carbon Dioxide to Formate on Lead Electrode in Aqueous Medium", J. of Applied Electrochem. 39 (2009), pp. 227-232.
Kaneco et al., "Photoelectrochemical Reduction of CO2 at P-Lnp Electrode in Copper Particle-Suspended Methanol", Chem. Eng. J. 148 (2009), pp. 57-62.
Liu et al., "Observation of Surface Structural Changes of Pt Octahedron Nanoparticles and its Effect in Electrocatalysis Oxidation of Methanol", Catalysis Communications 10 (2009), pp. 1244-1247.
Lukaszewski et al., "Electrosorption of Carbon Dioxide on Platinum Group Metals and Alloys-A Review", J. of Solid State Electrochem. 13 (2009), pp. 813-827.
Ma et al., "A Short Review of Catalysis for CO2 Conversion", Catal. Today 148 (2009), pp. 221-231.
Ohya et al., "Electrochemical Reduction of CO2 in Methanol with Aid of CuO and Cu2O", Catalysis Today 148 (2009), pp. 329-334.
Photinon et al., "Thick-Film carbon dioxide sensor via anodic adsorbate stripping technique and its structural dependence", Sensors 9 (2009), pp. 7203-7216.
Rakowski et al. Development of Molecular Electrocatalysts for CO2 Reduction and H2 Production/Oxidation Acc. Chem. Res. 42 (2009) pp. 1974-1982.
Rezaei et al., Application of Ionic Liquids as an Electrolyte Additive on the Electrochemical Behavior of Lead Acid Battery. J. of Power Sources, 2009. 187(2): pp. 605-612.
Yan Adsorption of CO2 on the rutile (110) surface in ionic liquid. A molecular dynamics simulation J. Phys. Chem. C 113 (2009) pp. 19389-19392.
Yuan, Electrochemical activation of carbon dioxide for synthesis of dimethyl carbonate in an ionic liquid Electrochimica Acta 54 (2009) pp. 2912-2915.
Zhang et al., Chiral ionic liquids improved the asymmetric cycloaddition of CO2 to epoxides Green Chem. 11 (2009) pp. 935-938.
Zhang Hydrogenation of CO2 to formic acid promoted by a diamine-functionalized ionic liquid ChemSusChem 2 (2009) pp. 234-238.
Cahill et al., "Investigation of proton dynamics and the proton transport pathway in choline dihydrogen phosphate using solid-state NMR", Physical Chem. Chemical Physics 12 (2010), pp. 5431-5438.
Cole et al., Using a one electron shuttle for the multielectron reduction of CO2 to methanol: kinetic, mechanism and structural insights, JACS 132, (2010) pp. 11539-11551.
Li, "Electrocatalytic Reduction of CO2 to Small Organic Molecule Fuels on Metal Catalysts", Advances in CO2 Conversion and Utilization (2010), pp. 55-76.
Lopez-Cudero et al., "CO electrooxidation on carbon supported platinum nanoparticles: Effect of aggregation", J. of Electroanalytical Chem. 644 (2010), pp. 117-126.
Ogura et al., "CO2 Attraction by Specifically Adsorbed Anions and Subsequent Accelerated Electrochemical Reduction", Electrochimica Acta 56 (2010), pp. 381-386.
Tian et al., "Direct Electrodeposition of Tetrahexahedral Pd Nanocrystals with High-Index Facets and High Catalytic Activity for Ethanol Electrooxidation", J. of the Am. Chem. Soc. 132 (2010), pp. 7580-7581.
Gazsi et al., "Decomposition and Reforming of Formic Acid on Supported Au Catalysts: Production of CO-Free H2", J. of Phys. Chem. C 115 (2011), pp. 15459-15466.
Koper, "Structure Sensitivity and Nanoscale Effects in Electrocatalysis", Nanoscale 3 (2011), pp. 2054-2073.
Morris et al., "Electrocatalytic Carbon Dioxide Activation: The Rate-Determining Step of Pyridinium-Catalyzed CO2 Reduction", ChemSusChem 4 (2011), pp. 191-196.

(56) References Cited

OTHER PUBLICATIONS

Perez et al., "Particle Size Effect for Ethanol Electro-Oxidation on Pt/C Catalysts in Half-Cell and in a Single Direct Ethanol Fuel Cell", J. of Electroanalytical Chem. 654 (2011), pp. 108-115.
Rosen et al., "Ionic Liquid-Mediated Selective Conversion of CO2 to CO at Low Overpotentials", Sci. 334 (2011), pp. 643-644.
Sabatier et al., "Chimie Organique.—Sur la Decomposition Catalytique de 1 'acide Formique'", Comptes Rendus Hebdomadaires Des Seances De L'Academie Dessciences 152 (2011), pp. 1213-1215.
Solla-Gullon et al., "Shape Dependent Electrocatalysis", Annual Reports on the Progress of Chem.—Section C 107 (2011), pp. 263-297.
Kaneco et al., "Carbon Dioxide Sequestration Technology by Electrochemical Conversion at Cadmium Electrode in Methanol Under Mild Conditions", Photo/Electrochem. & Photo Biology in Environment, Energy and Fuel (2003), pp. 181-189.
Liu et al., "General Rules for Predicting Where a Catalytic Reaction Should Occur on Metal Surfaces: A Density Functional Theory Study of C—H and C—O Bond Breaking/Making on Flat, Stepped and Kinked Metal Surfaces", J. of the Am. Chem. Soc. 125 (2003), pp. 1958-1967.
Magdesieva et al., "Lutetium Monophthalocyanine and Diphthalocyanine Complexes and Lithium Naphthalocyanine as Catalysts for Electrochemical CO2 Reduction", J. of the Electrochem. Soc. 150 (2003), pp. E608-E612.
Aulice Scibioh et al, "Electrochemical Reduction of Carbon Dioxide: A Status Report", Indian Natn. Sci. Acad. 70 (2004), pp. 407-462.
Jessop et al., "Recent Advances in the Homogeneous Hydrogenation of Carbon Dioxide", Coordination Chem. Rev. 248 (2004), pp. 2425-2442.
Koleli et al., "Reduction of CO2 Under High Pressure and High Temperature on Pb-Granule Electrodes in a Fixed-Bed Reactor in Aqueous Medium", Applied Catalysis A: General 274 (2004), pp. 237-242.
Maillard et al., "Size Effects on Reactivity of Pt Nanoparticles in CO Monolayer Oxidation: The Role of Surface Mobility", Faraday Discussions 125 (2004), pp. 357-377.
Ogura et al., "Selective Formation of Ethylene from CO2 by Catalytic Electrolysis at a Three-Phase Interface", Catalysis Today 98 (2004), pp. 515-521.
Ramirez et al., "A Supramolecular Cobalt-Porphyrin-modified Electrode, toward the Electroreduction of CO2", J. of Coordination Chem. 57 (2004), pp. 249-255.
Star et al., "Nanoelectronic Carbon Dioxide Sensors", Advanced Materials 16 (2004) pp. 2049-2051.
Yano et al., "Selective Electrochemical Reduction of CO2 to Ethylene at a Three-Phase Interface on Copper(I) Halide-Confined Cu-Mesh Electrodes in Acidic Solutions of Potassium Halides", J. of Electroanalytical Chem. 565 (2004), pp. 287-293.
Zhao et al., "Electrochemical Reduction of Supercritical Carbon Dioxide in Ionic Liquid 1-N-Butyl-3-Methylimidazolium Hexafluorophosphate", The J. of Supercritical Fluids 32 (2004), pp. 287-291.
Arenz et al., "The Effect of the Particle Size on the Kinetics of CO Electrooxidation on High Surface Area Pt Catalysts", J. of the Am. Chem. Soc. 127 (2005), pp. 6819-6829.
Dube et al., "Influence of Adsorption Processes on the CO2 Electroreduction, An Electrochemical Mass Spectrometry Study", J. of Electroanalytical Chem. 582 (2005), pp. 230-240.
Laitar et al., "Efficient Homogeneous Catalysis in the Reduction of CO2 to CO", J. of the Am. Chem. Soc. 127 (2005) pp. 17196-17197.
Maillard et al., "Influence of Particle Agglomeration on the Catalytic Activity of Carbon-Supported Pt Nanoparticles in CO Monolayer Oxidation", Phys. Chem. Chem. Phys. 7 (2005), pp. 385-393.
Narayanan et al., "Catalysis with Transition Metal Nanoparticles in Colloidal Solution: Nanoparticle Shape Dependence and Stability", J. of Phys. Chem. B 109 (2005), pp. 12663-12676.

Ogura et al., "Reduction of CO2 to Ethylene at Three-Phase Interface Effects of Electrode Substrate and Catalytic Coating", J. of the Electrochem. Soc. 152 (2005), pp. D213-D219.
Perez et al., "In Situ FT-IR and Ex Situ EPR Analysis for the Study of the Electroreduction of Carbon Dioxide in N,N-Dimethylformamide Dimethylformamide on a Gold Interface", J. of Electroanalytical Chem. 578 (2005), pp. 87-94.
Qu et al., "Electrochemical Reduction of CO2 on RuO2/TiO2 Nanotubes Composite Modified Pt Electrode", Electrochimica Acta 50 (2005), pp. 3576-3580.
Rodriguez et al., "Specific Surface Reactions for Identification of Platinum Surface Domains: Surface Characterization and Electrocatalytic Tests", Electrochimica Acta 50 (2005), pp. 4308-4317.
Smolinka et al., "CO2 Reduction on Pt Electrocatalysts and its Impact on H2 Oxidation in CO2 Containing Fuel Cell Feed Gas—A Combined In Situ Infrared Spectroscopy, Mass Spectrometry and Fuel Cell Performance Study", Electrochimica Acta 50 (2005), pp. 5189-5199.
Blizanac et al., "Oxygen Reduction on Silver Low-Index Single-Crystal in Alkaline Solution: Rotating Ring DiskAg (hkl) Studies", J. Phys. Chem. 110 (2006), pp. 4735-4741.
Dubois in A. Bard, ed, Encyclopedia of Electrochem., 7a, pp. 202-225. Springer (2006).
Gattrell et al., "A Review of the Aqueous Electrochemical Reduction of CO2 to Hydrocarbons at Copper", J. of Electroanalytical Chem. 594 (2006), pp. 1-19.
Kaneco et al., "Electrochemical Reduction of CO2 in Copper Particle-Suspended Methanol", Chem. Eng. J. 119 (2006), pp. 107-112.
Kaneco et al., "Electrochemical Reduction of Carbon Dioxide to Ethylene at a Copper Electrode in Methanol Using Potassium Hydroxide and Rubidium Hydroxide Supporting Electrolytes", Electrochimica Acta 51 (2006), pp. 3316-3321.
Kaneco et al., "Electrochemical Reduction of CO2 to Methane at the Cu Electrode in Methanol with Sodium Supporting Salts and Its Comparison with Other Alkaline Salts", Energy & Fuels 20 (2006), pp. 409-414.
Li et al., "Development of a Continuous Reactor for the Electro-Reduction of Carbon Dioxide to Formate—Part 1: Process Variables", J. of Applied Electrochem. 36 (2006), pp. 1105-1115.
Raebiger et al., "Electrochemical Reduction of CO2 to CO Catalyzed by a Bimetallic Palladium Complex Organometallics", 25 (2006), pp. 3345-3351.
Silvester et al., "Electrochem in Room Temperature Ionic Liquids: A Review and Some Possible Applications", Z. Phys. Chem. 220 (2006), pp. 1247-1274.
Solla-Gullon et al., "CO Monolayer Oxidation on Semi-Spherical and Preferentially Oriented (100) and (111) Platinum Nanoparticles", Electrochem. Communications 8 (2006), pp. 189-194.
Yano et al., "Particle-Size Effect of Nanoscale Platinum Catalysts in Oxygen Reduction Reaction: An Electrochemical and 195Pt EC-NMR Study", Phys. Chem. Chem. Phys. 8 (2006), pp. 4932-4939.
Yano, "Selective Ethylene Formation by Pulse-Mode Electrochemical Reduction of Carbon Dioxide Using Copper and Copper-Oxide Electrodes", J. of Solid State Electrochem. 11 (2006), pp. 554-557.
Zhou et al., "Size Effects in Electronic and Catalytic Properties of Unsupported Palladium Nanoparticles in Electrooxidation of Formic Acid", J. of Phys. Chem. B 110 (2006), pp. 13393-13398.
Begum et al., "Electrocatalysis of CO2 Reduction by Ruthenium Benzothiazole and Bithiazole Complexes", Electrochem. Communications 9 (2007), pp. 2525-2528.
Dubois, "Electrochemical Reactions of Carbon Dioxide", Encyclopedia of Electrochem. (2007), p. 212.
Gattrell et al., "Electrochemical Reduction of CO2 to Hydrocarbons to Store Renewable Electrical Energy and Upgrade Biogas", Energy Convers. and Manage. 48 (2007), pp. 1255-1265.
Himeda, "Conversion of CO2 into Formate by Homogeneously Catalyzed Hydrogenation in Water: Tuning Catalytic Activity and Water Solubility Through the Acid-Base Equilibrium of the Ligand", European J. of Inorganic Chem. (2007), pp. 3927-3941.

(56) References Cited

OTHER PUBLICATIONS

Jitaru, "Electrochemical Carbon Dioxide Reduction—Fundamental and Applied Topics (Review)", J. of the U. of Chem. Tech. and Metallurgy 42 (2007), pp. 333-344.
Kaneco et al., "Effect of Sodium Cation on the Electrochemical Reduction of CO2 at a Copper Electrode in Methanol", J. of Solid State Electrochem. 11 (2007), pp. 490-495.
Lee et al., "Studies on Suppression of Hydrogen Evolution Reaction for Zinc/Air Fuel Cell", Material Sci. Forums 539-543 (2007), pp. 1427-1430.
Li et al., "Development of a Continuous Reactor for the Electro-Reduction of Carbon Dioxide to Formate—Part 2: Scale-Up", J. of Applied Electrochem. 37 (2007), pp. 1107-1117.
Lukaszewski et al., "Comparative EQCM Study on Electrooxidation of Carbon Oxides Adsorption Products on Noble Metals and their Alloys. Polycrystalline Pd-Based Systems", J. of Electroanalytical Chem. 606 (2007), pp. 117-133.
Subramanian et al., "Electrochemical Membrane Reactor for the Reduction of Carbon Dioxide to Formate", J. of Applied Electrochem. 37 (2007), pp. 255-260.
Tian et al., "Synthesis of Tetrahexahedral Platinum Nanocrystals with High-Index Facets and High Electro-Oxidation Activity", Sci. 316 (2007), pp. 732-735.
Xu et al., "Effects of Imidazolium Salts as Cocatalysts on the Copolymerization of CO2 with Epoxides Catalyzed by (Salen) CrIII Cl Complex", Polymer 48 (2007), pp. 3921-3924.
Yoshizawa-Fujita et al., "A New Class of Proton-Conducting Ionic Plastic Crystals Based on Organic Cations and Dihydrogen Phosphate", Electrochem. Communications 9 (2007), pp. 1202-1205.
Zhu et al., "Supported Choline Chloride/Urea as a Heterogeneous Catalyst for Chemical Fixation of Carbon Dioxide to Cyclic Carbonates", Green Chem. 9 (2007), pp. 169-172.
Bell, "Basic Research Needs: Catalysis for Energy", U.S. Department of Energy Report PNNL-17214 (2008), p. 69.
Chinese Office Action issued on Oct. 16, 2015 in connection with Chinese Application No. 201180033161.5.
Pease et al., "The Catalytic Combination of Ethylene and Hydrogen in the Presence of Metallic Copper III. Carbon Monoxide as a Catalyst Poison", J. Am. Chem. Soc. 47 (1925), pp. 1235-1240.
Urey et al., "Some Reactions of Atomic Hydrogen", J. of the Am. Chem. Soc. 51 (1929), pp. 3286-3290.
Udupa et al., "Electrolytic Reduction of Carbon Dioxide to Formic Acid", Electrochimica Acta 16 (1971), pp. 1593-1598.
Bregoli, "The Influence of Platinum Crystallite Size on the Electrochemical Reduction of Oxygen in Phosphoric Acid", Electrochimica Acta 23 (1978), pp. 489-492.
Fisher et al., "Electrocatalytic Reduction of Carbon Dioxide by Using Macrocycles of Nickel and Cobalt", J. Am. Chem. Soc., vol. 102, No. 24 (1980), pp. 7361-7363.
Weiss et al., "Formose Sugars from Formaldehyde", Applied Catalysis 1 (1981), pp. 237-246.
Eggins et al., "Voltammetry of Carbon Dioxide: A General Survey of Voltammetry at Different Electrode Materials in Different Solvents", J. Electroanalytical Chem. 148 (1983), pp. 17-24.
Danly, "Development and Commercialization of the Monsanto electrochemical Adiponitrile Process", J. Electrochem. Soc. 131 (1984), pp. 435C-442C.
Franklin et al., "The Effect of Quaternary Ammonium Salts on the Anodic Oxidation of Ethanol", Surface Tech. 24(2) (1985), pp. 143-155.
Ikeda et al., "Selective Formation of Formic Acid. Oxalic Add, and Carbon Monoxide by Electrochemical Reduction of Carbon Dioxide", Bull. Chem. Soc. Japan, vol. 60 (1987), pp. 2517-2522.
Chandrasekaran, "In-situ Spectroscopic Investigation of Adsorbed Intermediate Radicals in Electrochemical Reactions: Carbon Dioxide(1−) (CO2−) on Platinum", Surface Science 185 (1987), pp. 495-514.
Dewulf et al., "The electrochemical reduction of CO2 to CH4 and C2H4 at Cu/Nafion Electrodes (Solid Polymer Electrolyte structures)", Catalysis Letters 1 (1987), pp. 73-80.

Dewulf et al., "Electrochemical and Surface Studies of Carbon Dioxide Reduction to Methane and Ethylene at Copper Electrodes in Aqueous Solutions", J. of the Electrochem. Soc. 136 (1989), pp. 1686-1691.
Kinoshita, "Particle Size Effects for Oxygen Reduction on Highly Dispersed Platinum in Acid Electrolytes", J. of the Electrochem. Soc. 137 (1990), pp. 845-848.
Azuma et al., "Electrochemical Reduction of Carbon Dioxide on Various Metal, Electrodes in Low-Temperature Aqueous KHCO3 Media", J. Electrochem. Soc. 137 (1990), pp. 1772-1778.
Noda et al., "Electrochemical Reduction of Carbon Dioxide at Various Metal Electrodes in Aqueous Potassium Hydrogen Carbonate Solution", Bull. Chem. Soc. Jpn. 63 (1990), pp. 2459-2462.
Hori et al., "Electrochemical Evidence of Intermediate Formation of Adsorbed Carbon Monoxide in Cathodic Reduction of CO2 at a Nickel Electrode", Electrochimica Acta 35 (1990), pp. 1777-1780.
Dubois et al., "Electrochemical Reduction of Carbon Dioxide Catalyzed by [Pd(Triphosphine)(Solvent)](BF4)2 Complexes: Synthetic and Mechanistic Studies", J. Am. Chem. Soc. 113 (1991), pp. 8753-8764.
Derien et al., "Activation of Carbon Dioxide: Nickel-Catalyzed Electrochemical Carboxylation of Diynes", J. Organic Chem. 58 (1993), pp. 2578-2588.
Seshadri et al., "A New Homogeneous Electrocatalyst for the Reduction of Carbon Dioxide to Methanol at Low Overpotential", J. Electroanalytical Chem. 372 (1994), pp. 145-150.
Kabbabi et al., "Particle-Size Effect for Oxygen Reduction and Methanol Oxidation on Pt/C Inside a Proton Exchange Membrane", J. of Electroanalytical Chem. 373 (1994), pp. 251-254.
Meiwes-Broer, "Work Functions of Metal Clusters", Hyperfine Interactions 89 (1994), pp. 263-269.
Saeki et al., "Electrochemical Reduction of Liquid CO2: Drastic Enhancement of Current Density", J. of the Electrochem. Soc. 141 (1994), pp. L130-L132.
Podlovchenko et al., "Electroreduction of Carbon Dioxide on Palladium Electrodes at Potentials Higher than the Reversible Hydrogen Potential". J. of Electroanalytical Chem. 373 (1994), pp. 185-187.
Dietz et al., "Influence of Substituted Benzaldehydes and their Derivatives as Inhibitors for Hydrogen Evolution in Lead/Acid Batteries", J. of Power Sources 53 (1995), pp. 359-365.
Idriss et al., "Two Routes to Formaldehyde from Formic Acid on TiO2(001) Surfaces", Surface Science 348 (1996), pp. 39-48.
Eggins et al., "Improved Yields of Oxalate, Glyoxylate and Glycolate from the Electrochemical Reduction of Carbon Dioxide in Methanol", J. of Applied Electrochem. 27 (1997), pp. 706-712.
Furuya et al., "High Performance Ru-Pd Catalysts for CO2 Reduction at Gas-Diffusion Electrodes", J. of Electroanalytical Chem. 431 (1997), pp. 39-41.
Hoshi et al., "Electrochemical Reduction of CO2 on Single Crystal Electrodes of Silver Ag(111), Ag(100) and Ag (110)", J. of Electroanalytical Chem. 440 (1997), pp. 283-286.
Popic et al., "Reduction of Carbon Dioxide on Ruthenium Oxide and Modified Ruthenium Oxide Electrodes in 0.5 M NaHCO3", J. of Electroanalyticai Chem. 421 (1997), pp. 105-110.
Sung et al., "Structure of Chemisorbed Sulfur on a Pt(III) Electrode", J. of the Am. Chem. Soc. 119 (1997), pp. 194-200.
Kaneco et al., "Electrochemical Conversion of Carbon Dioxide to Formic Acid on Pb in KOH/Methane Electrolyte at Ambient Temperature and Pressure", Energy 23 (1998), pp. 1107-1112.
Smolinski et al., "Effect of Surface Order on Adsorption of Sulfate Ions on Silver Electrodes", J. of Electroanalytical Chem. 442 (1998), pp. 41-47.
Sobkowski et al., "Interaction of Sulfate Ions with Monocrystalline Silver Electrodes", Colloids Surfaces A: Physicochem. and Eng. Aspects 134 (1998), pp. 39-45.
Yano et al., "Effects of Additives in Zinc Alloy Powder on Suppressing Hydrogen Evolution", J. of Power Sources 74 (1998), pp. 129-134.
Ikeda et al., "Zinc Ion Effect on Electrochemical Reduction of Carbon Dioxide at Zinc Electrode in Aqueous Solutions", Electrochemistry (Tokyo) 67 (1999), pp. 27-33.

(56) References Cited

OTHER PUBLICATIONS

Kaneco et al., "Electrochemical Reduction of Carbon Dioxide to Ethylene with High Faradaic Efficiency at a Cu Electrode in CsOH/Methanol", Electrochimica Acta 44 (1999), 4701-4706.
Welton, "Room-Temperature Ionic Liquids. Solvents for Synthesis and Catalysis", Chem. Rev. 99 (1999), pp. 2071-2083.
Hoshi et al., "Electrochemical Reduction of Carbon Dioxide at a Series of Platinum Single Crystal Electrodes", Electrochimica Acta 45 (2000), pp. 4263-4270.
Kiss, "Palladium-Catalyzed Reppe Carbonylation", Chem. Rev. 101 (2001), pp. 3435-3456.
Masel, "Chemical Kinetics and Catalysis", Wiley (2001), pp. 702-742.
Ishida et al., "High-Temperature Electrochemical Reduction of Carbon Dioxide Using an Ionic Liquid", The Chem. Soc. of Jpn, Proceeding of 82th Autumn Meeting, Sep. 10, 2002, pp. 46, 1A6-01.
Takahashi et al., "Electrochemical Reduction of $CO_2$ at Copper Single Crystal Cu(S)-[N(111) X (111)] and Cu(S)-[N (110) X (100)] Electrodes", J. of Electroanalytical Chem. 533 (2002), pp. 135-143.
Yang et al., "Electrochemical Activation of Carbon Dioxide in Ionic Liquid: Synthesis of Cyclic Carbonates at Mild Reaction Conditions", Chem. Communications. (2002), pp. 274-275.
Chaplin et al., "Effects of Process Conditions and Electrode Material on Reaction Pathways for Carbon Dioxide Electroreduction with Particular Reference to Formate Formation", J. of Applied Electrochem. 33 (2003), pp. 1107-1123.
Cherstiouk et al., "Model Approach to Evaluate Particle Size Effects in Electrocatalysis: Preparation and Properties of Pt Nanoparticles Supported on GC and HOPG", Electrochimica Acta 48 (2003), pp. 3851-3860.
Davis et al., "Commercially Available Salts as Building Blocks for New Ionic Liquids", ACS Symp Ser. 856 (2003), pp. 100-107.
Hori et al., "Electrochemical Reduction of Carbon Dioxide at Various Series of Copper Single Crystal Electrodes", J. of Molecular Catalysis A: Chem. 199 (2003), pp. 39-47.
Hoshi et al., "Electrochemical Reduction of Carbon Dioxide on Kinked Stepped Surfaces of Platinum Inside the Stereographic Triangle", J. of Electroanalytical Chem. 540 (2003), pp. 105-110.
International Search Report issued on Jul. 6, 2011, in connection with PCT/2011/030098.
International Search Report and Written Opinion of the International Searching Authority issued on Oct. 31, 2011, in connection with PCT/US2011/042809.
Chen et al., "Role of Surface Defect Sites: From Pt Model Surfaces to Shape-Controlled Nanoparticles", Chem. Sci. 3 (2012), pp. 136-147.
Singh et al., "Comparison of Oxygen Reduction Reaction at Silver Nanoparticles and Polycrystalline Silver Electrodes in Alkaline Solution", J. of Phys. Chem. C 116 (2012), pp. 10656-10663.
Yu et al., "Carboxylation of Terminal Alkynes with Carbon Dioxide Catalyzed by Poly(N-Heterocyclic Carbene)-Supported Silver Nanoparticles", Adv. Synth. Catal. 354 (2012), pp. 969-974.
Written Opinion of the International Searching Authority issued on Sep. 26, 2012, in connection with International Application No. PCT/US2011/030098.
Deng et al., "Linked Strategy for the Production of Fuels Via Formose Reaction", Sci. Reports 3 (2013), p. 1244.
Zhu et al., "Monolayers of choline chloride can enhance desired electrochemical reactions and inhibit undesirable ones", Electrochimica Acta 96 (2013), pp. 18-22.
International Preliminary Report on Patentability issued on Jan. 3, 2013 in connection with International Application No. PCT/US2011/042809.
International Preliminary Report on Patentability issued on Jan. 3, 2013 in connection with International Application No. PCT/US2011/030098.
International Search Report and Written Opinion issued on Feb. 15, 2013 in connection with PCT/US2012/043651.
Third-Party Submissions Under 37 CFR I.290, submitted on Sep. 17 and 18, 2013, in connection with co-owned U.S. Appl. No. 12/830,338, and Concise Description of Relevance for each of the references cited in the Third Party Submissions.
International Preliminary Report on Patentability issued on Jan. 9, 2014 in connection with International Application PCT/US2012/043651.
International Search Report and Written Opinion issued on May 16, 2014 in connection with PCT/US2013/061506.
International Search Report and Written Opinion issued on Jun. 17, 2014 in connection with PCT/US2014/018067.
Chinese Office Action issued on Aug. 5, 2014 in connection with Chinese Application No. 201180023851.2.
Patent Examination Report No. 1 issued on Dec. 12, 2014 in connection with Australian Application 2011230545.
Office Action issued on Jan. 27, 2015 in connection with Japanese Application 2013-501536.
Bard et al., Electrochemical Methods Fundamentals and Applications (1980), pp. 22-24.
Karp et al., "Isolation of Nucleic Acids Using Silica-Gel Based Membranes: Methods Based on the Use of QIAamp Spin Columns", Molecular Tools for Screening Biodiversity (1998), pp. 59-63.
Patent Examination Report No. 2 dated Jan. 8, 2016 in connection with Australian Application No. 2012272770.

\* cited by examiner

ELECTROCATALYTIC PROCESS FOR CARBON DIOXIDE CONVERSION

CROSS-REFERENCE TO RELATED APPLICATIONS

This application is a divisional of U.S. patent application Ser. No. 13/445,887 filed on Apr. 12, 2012, entitled "Electrocatalysts for Carbon Dioxide Conversion", which in turn is a continuation-in-part of U.S. patent application Ser. No. 12/830,338 filed Jul. 4, 2010, entitled "Novel Catalyst Mixtures," which claims priority benefits from U.S. Provisional Patent Application Ser. No. 61/317,955 filed Mar. 26, 2010, also entitled "Novel Catalyst Mixtures". This application is also related to International Application No. PCT/US2011/030098 filed Mar. 25, 2011, entitled "Novel Catalyst Mixtures", which claimed priority benefits from the '955 U.S. provisional application and the '388 U.S. application. This application is also related to International Application No. PCT/US2011/042809 filed Mar. 25, 2011, entitled "Novel Catalyst Mixtures", which claimed priority benefits from the '338 U.S. application, the '098 international application, U.S. Provisional Patent Application Ser. No. 61/484,072 filed May 9, 2011, and U.S. patent application Ser. No. 13/174,365 filed Jun. 30, 2011, all entitled "Novel Catalyst Mixtures". This application is also related to U.S. Provisional Patent Application 61/499,225, filed Jun. 29, 2011, entitled "Low Cost Carbon Dioxide Sensors," and U.S. Provisional Patent Application 61/540,044, filed Sep. 28, 2011, entitled "On Demand Carbon Monoxide Generator for Therapeutic and Other Applications". Each of the above applications is hereby incorporated by reference herein in its entirety.

STATEMENT OF GOVERNMENT INTEREST

This invention was made, at least in part, with U.S. government support under U.S. Department of Energy Grant DE-SC0004453. The government has certain rights in the invention.

FIELD OF THE INVENTION

The field of the invention is catalysis and catalysts. The catalysts of this invention are applicable, for example, to the electrochemical conversion of carbon dioxide into useful products.

BACKGROUND OF THE INVENTION

There is a present need to decrease carbon dioxide ($CO_2$) emissions from industrial facilities. Over the years, a number of electrochemical processes have been suggested for the conversion of $CO_2$ into useful products. Processes for $CO_2$ conversion and the catalysts for them are discussed in U.S. Pat. Nos. 3,959,094, 4,240,882, 4,523,981, 4,545,872, 4,595,465, 4,608,132, 4,608,133, 4,609,440, 4,609,441, 4,609,451, 4,620,906, 4,668,349, 4,673,473, 4,711,708, 4,756,807, 4,818,353, 5,064,733, 5,284,563, 5,382,332, 5,457,079, 5,709,789, 5,928,806, 5,952,540, 6,024,855, 6,660,680, 6,987,134 (the '134 patent), U.S. Pat. Nos. 7,157,404, 7,378,561, 7,479,570, U.S. patent application 20080223727 (the '727 application) and papers reviewed by Hon (Modern Aspects of Electrochemistry, 42, 89-189, 2008) ("the Hon Review"), Gattrell, et al. (Journal of Electroanalytical Chemistry, 594, 1-19, 2006) ("the Gattrell review"), DuBois (Encyclopedia of Electrochemistry, 7a, 202-225, 2006) ("the DuBois review").

Figure 1:
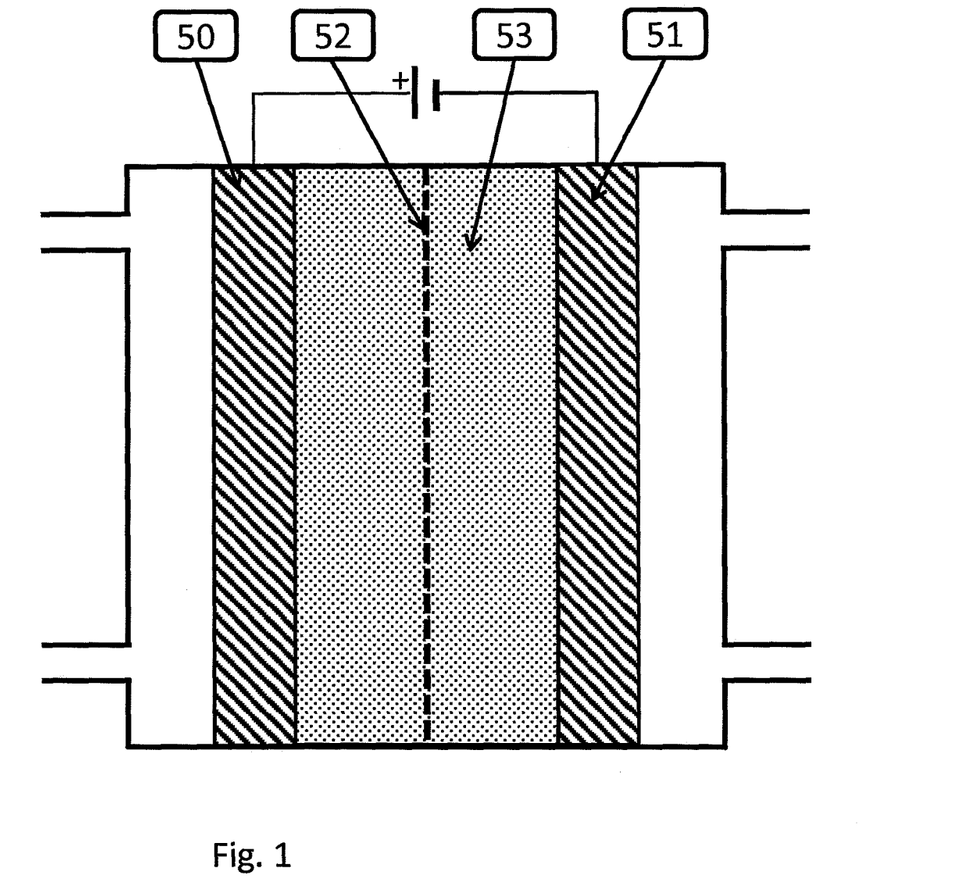
FIG. 1 is a diagram of a typical electrochemical cell.

Generally an electrochemical cell contains an anode (50), a cathode (51) and an electrolyte (53) as indicated in FIG. 1. Catalysts are placed on the anode, and or cathode, and or in the electrolyte to promote desired chemical reactions. During operation, reactants or a solution containing reactants is fed into the cell. Then a voltage is applied between the anode and the cathode, to promote an electrochemical reaction.

When an electrochemical cell is used as a $CO_2$ conversion system, a reactant comprising $CO_2$, carbonate or bicarbonate is fed into the cell. A voltage is applied to the cell, and the $CO_2$ reacts to form new chemical compounds. Examples of cathode reactions in the Hori Review include:

$$CO_2 + 2e^- + 2H^+ \rightarrow CO + H_2O$$

$$2CO_2 + 2e^- \rightarrow CO + CO_3^{2-}$$

$$CO_2 + H_2O + 2e^- \rightarrow CO + 2OH^-$$

$$CO_2 + 2H_2O + 4e^- \rightarrow HCO^- + 3OH^-$$

$$CO_2 + 2H_2O + 2e^- \rightarrow H_2CO + 2OH^-$$

$$CO_2 + H_2O + 2e^- \rightarrow (HCO_2)^- + OH^-$$

$$CO_2 + 2H_2O + 2e^- \rightarrow H_2CO_2 + 2OH^-$$

$$CO_2 + 5H_2O + 6e^- \rightarrow CH_3OH + 6OH^-$$

$$CO_2 + 6H_2O + 8e^- \rightarrow CH_4 + 8OH^-$$

$$2CO_2 + 8H_2O + 12e^- \rightarrow C_2H_4 + 12OH^-$$

$$2CO_2 + 9H_2O + 12e^- \rightarrow CH_3CH_2OH + 12OH^-$$

$$2CO_2 + 6H_2O + 8e^- \rightarrow CH_3COOH + 8OH^-$$

$$2CO_2 + 5H_2O + 8e^- \rightarrow CH_3COO^- + 7OH^-$$

$$2CO_2 + 10H_2O + 14e^- \rightarrow C_2H_6 + 14OH^-$$

$$CO_2 + 2H^+ + 2e^- \rightarrow CO + H_2O, \text{ acetic acid, oxalic acid, oxylate}$$

$$CO_2 + 4H^+ + 4e^- \rightarrow CH_4 + O_2$$

where e- is an electron. The examples given above are merely illustrative and are not meant to be an exhaustive list of all possible cathode reactions.

Examples of reactions on the anode mentioned in the Hori Review include:

$$2O^{2-} \rightarrow O_2 + 4e-$$

$$2CO_3^{2-} \rightarrow O_2 + 2CO_2 + 4e-$$

$$4OH^- \rightarrow O_2 + 2H_2O + 4e-$$

$$2H_2O \rightarrow O_2 + 4H^+ + 4e-$$

The examples given above are merely illustrative and are not meant to be an exhaustive list of all possible anode reactions.

In the previous literature, catalysts comprising one or more of V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Sn, Tl, Pb, Bi, Sb, Te, U, Sm, Tb, La, Ce, and Nd have all shown activity for $CO_2$ conversion. Reviews include Hori (Modern Aspects of Electrochemistry, 42, 89-189, 2008) ("the Hori Review"), Gattrell, et al. (Journal of Electroanalytical Chemistry, 594, 1-19, 2006) ("the Gattrell review"), DuBois (Encyclopedia of Electrochemistry, 7a, 202-225, 2006) ("the DuBois review"), and the papers Li, et al. (Journal of Applied Electrochemistry, 36, 1105-1115, 2006, Li, et al. (Journal of Applied Electrochemistry, 37, 1107-1117, 2007, and Oloman, et al. (ChemSusChem, 1, 385-391, 2008) ("the Li and Oloman papers").and references therein.

The results in the Hori Review show that the conversion of $CO_2$ is only mildly affected by solvent unless the solvent also acts as a reactant. Water can act like a reactant, so reactions in water are different than reactions in non-aqueous solutions. But the reactions are the same in most non-aqueous solvents, and importantly, the overpotentials are almost the same in water and in the non-aqueous solvents.

The catalysts have been in the form of either bulk materials, supported particles, collections of particles, small metal ions or organometallics. Still, according to Bell (A. Bell. Ed, Basic Research Needs, Catalysis For Energy, US Department Of Energy Report PNNL17712, 2008) ("the Bell Report") "The major obstacle preventing efficient conversion of carbon dioxide into energy-bearing products is the lack of catalyst" with sufficient activity at low overpotentials and high electron conversion efficiencies.

The overpotential is associated with lost energy of the process, and so the overpotential should be as low as possible. Yet, according to The Bell Report "Electron conversion efficiencies of greater than 50 percent can be obtained, but at the expense of very high overpotentials". This limitation needs to be overcome before practical processes can be obtained.

A second disadvantage of many of the catalysts is that they also have low electron conversion efficiency. Catalyst systems are considered practical where electron conversion is over 50%.

U.S. patent application Ser. No. 12/830,338 (published as US 2011/0237830), and Ser. No. 13/174,365 (published as US 2012/0308903), and in International Application No. PCT/US2011/030098 (published as WO 2011/120021) and PCT/US2011/0042809 (published as WO 2012/006240) disclose that a catalyst mixture containing an active metal and a Helper Catalyst could catalyze $CO_2$ conversions with low overpotential and high electron conversion efficiency. However, the catalysts disclosed in these patent applications showed a lower activity than was desired.

The examples above consider applications for $CO_2$ conversion, but the present electrocatalysts overcome limitations of other systems. For example, some commercial $CO_2$ sensors use an electrochemical reaction to detect the presence of $CO_2$. At present, these sensors require over 1-5 watts of power, which is too high for portable sensing applications.

SUMMARY OF THE INVENTION

The invention provides a novel catalyst mixture that can overcome one or more of the limitations of low rates, high overpotentials and low electron conversion efficiencies (namely, selectivities), low rates for catalytic reactions and high power for sensors. The catalyst mixture includes at least one Catalytically Active Element in the form of supported or unsupported particles wherein the particles have an average particle size (as defined below) between about 0.6 nm and 100 nm, preferably between 0.6 nm and 40 nm, and most preferable between 0.6 nm and 10 nm.

The invention is not limited to catalysts for $CO_2$ conversion. In particular, catalysts that include Catalytically Active Elements and Helper Catalysts might enhance the rate of a wide variety of chemical reactions. Reaction types include: homogeneously catalyzed reactions, heterogeneously catalyzed reactions, chemical reactions in chemical plants, chemical reactions in power plants, chemical reactions in pollution control equipment and devices, chemical reactions in fuel cells, and chemical reactions in sensors. The invention includes all of these examples. The invention also includes processes using these catalysts.

DETAILED DESCRIPTION OF EMBODIMENT(S)

The invention disclosed herein is not limited to the particular methodology, protocols, and reagents described herein, as these can vary as persons familiar with the technology involved here will recognize. The terminology employed herein is used for the purpose of describing particular embodiments only, and is not intended to limit the scope of the invention. As used herein and in the appended claims, the singular forms "a," "an," and "the" include the plural reference unless the context clearly dictates otherwise. Thus, for example, a reference to "a linker" is a reference to one or more linkers and equivalents thereof known to persons familiar with the technology involved here.

Unless defined otherwise, all technical and scientific terms used herein have the same meanings as commonly understood by persons familiar with the technology involved here. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as persons familiar with the technology involved here would recognize, even if not explicitly stated herein.

Any numerical value ranges recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32, and so on, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the invention are defined specifically. Particular methods, devices, and materials are described, although any methods and materials similar or equivalent to those described herein can be used in the practice or testing of the invention. All references referred to herein are incorporated by reference herein in their entirety.

DEFINITIONS

The term "electrochemical conversion of $CO_2$" as used here refers to any electrochemical process where carbon dioxide, carbonate, or bicarbonate is converted into another chemical substance in any step of the process.

The term "CV" as used here refers to a cyclic voltammogram or cyclic voltammetry.

The term "Overpotential" as used here refers to the potential (voltage) difference between a reaction's thermodynamically determined reduction or oxidation potential and the potential at which the event is experimentally observed.

The term "Cathode Overpotential" as used here refers to the overpotential on the cathode of an electrochemical cell.

The term "Anode Overpotential" as used here refers to the overpotential on the anode of an electrochemical cell.

The term "Electron Conversion Efficiency" refers to selectivity of an electrochemical reaction. More precisely, it is defined as the fraction of the current that is supplied to the cell that goes to the production of a desired product.

The term "Catalytically Active Element" as used here refers to any chemical element that can serve as a catalyst for the electrochemical conversion of $CO_2$.

The term "Helper Catalyst" refers to any organic molecule or ion, or a mixture of organic molecules and or ions, that does at least one of the following:
 (a) Speeds up a chemical reaction or
 (b) Lowers the overpotential of the reaction without being substantially consumed in the process.

The term "Active Element, Helper Catalyst Mixture" refers to any mixture that includes one or more Catalytically Active Element(s) and at least one Helper Catalyst The term "Ionic Liquid" refers to salts or ionic compounds that form stable liquids at temperatures below 200° C.

The term "Deep Eutectic Solvent" refers to an ionic solvent that includes a mixture which forms a eutectic with a melting point lower than that of the individual components.

The term "EMIM" refers to 1-ethyl-3-methylimidazolium cations.

The term "EMIM-BF4" refers 1-ethyl-3-methylimidazolium tetrafluoroborate.

The term "Particle Size" refers to the average diameter of the catalytically active element particles in a catalyst or metal powder as determined by any of the following methods: x-ray line broadening or surface area measurements as described in section [0089]. The term "QRE" refers to a quasi-reference electrode.

The term "Ag-QRE" refers to a silver quasi reference electrode.

The term "potential of the peak" refers to the potential where the absolute value of the current is maximized.

Specific Description

The invention relates generally to Active Element, Helper Catalyst Mixtures where the mixture does at least one of the following:
 Speeds up a chemical reaction, or
 Lowers the overpotential of the reaction,
 without being substantially consumed in the process.

For example such mixtures can lower the overpotential for $CO_2$ conversion to a value less than the overpotentials seen when the same Catalytically Active Element is used without the Helper Catalyst.

U.S. patent application Ser. No. 12/830,338 (published as US 2011/0237830), and Ser. No. 13/174,365 (not yet published), and in International Application No. PCT/US2011/030098 (published as WO 2011/120021) and PCT/US2011/042809 (published as WO 2012/006240) disclose that a catalyst mixture containing a Catalytically Active Metal and a Helper Catalyst could catalyze $CO_2$ conversions with low overpotential and high electron conversion efficiency. Active Metals included one or more of V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Sn, Tl, Pb, Bi, Sb, Te, U, Sm, Tb, La, Ce, and Nd. Examples of Helper Catalysts included one or more of phosphines, imidazoliums, pyridiniums, pyrrolidiniums, phosphoniums, sulfoniums, prolinates, methioninates, cholines, acetylcholines, alanines, aminoacetonitriles, methylammoniums, arginines, aspartic acids, threonines, chloroformamidiniums, thiouroniums, quinoliniums, pyrrolidinols, serinols, benzamidines, sulfamates, acetates, carbamates, triflates, and cyanides.

Of course, the '338 U.S. application, the '365 U.S. application, the '098 international application and the '809 international application disclose that not every substance listed above will act as a Helper Catalyst. In general, one can determine whether a given substance S is a Helper Catalyst for a reaction R catalyzed by an active metal M as follows:
 Fill a standard 3 electrode electrochemical cell with the electrolyte commonly used for reaction R. Common electrolytes such as 0.1 M sulfuric acid or 0.1 M KOH in water can often be used.
 Mount the active metal on the working electrode in the 3 electrode electrochemical cell, with an appropriate counter electrode.
 Run several CV cycles to clean the active metal.
 Measure the reversible hydrogen electrode (RHE) potential in the electrolyte.
 Load the reactants for the reaction R into the cell, and measure a CV of the reaction R, noting the potential of the peak associated with the reaction R.

Calculate V1=the difference between the onset potential of the peak associated with the reaction R and RHE.

Calculate V1A=the difference between the potential of the peak associated with the reaction R and RHE.

Add 0.0001 to 99.9999% of the substance S to the electrolyte.

Measure RHE in the reaction with Helper Catalyst.

Measure the CV of reaction R again, noting the potential of the peak associated with the reaction R.

Calculate V2=the difference between the onset potential of the peak associated with the reaction R and RHE.

Calculate V2A=the difference between the potential of the peak associated with the reaction R and RHE.

If V2<V1 or V2A<V1A at any concentration of the substance S between 0.0001 and 99.9999%, the substance S is a Helper Catalyst for the reaction.

Further, the Helper Catalyst could be in any one of the following forms: (i) a solvent for the reaction; (ii) an electrolyte; (iii) an additive to any component of the system; or (iv) something that is bound to at least one of the catalysts in a system. These examples are meant for illustrative purposes only, and are not meant to limit the scope of the invention.

The catalyst disclosed in '338 U.S. application, the '365 U.S. application, the '098 international application and the '809 international application allowed $CO_2$ to be converted to useful products at low overpotentials and high electron conversion efficiencies. In particular, an EMIM silver catalyst, with 100 nm silver particles, allowed $CO_2$ to be converted with an electron conversion efficiency as high as 99%, and an overpotential as small as 0.17 V. Unfortunately, the silver/EMIM catalysts disclosed in the '338 U.S. application, the '365 U.S. application, the '098 international application and the '809 international application had a lower catalytic activity than was desired.

In the foregoing applications, new catalyst formulations are disclosed that maintain the ability to convert $CO_2$ with a high electron conversion efficiency and low overpotential, but also shows an improved specific catalytic activity. The catalyst was prepared by modifying the structure of the silver so it is more active. The catalyst can be in the form of supported or unsupported metal particles wherein the average particle size is below about 100 nm, preferably between 0.6 nm and 40 nm, more preferably between 0.6 nm and 20 nm, and most preferably between 0.6 nm and 10 nm.

In this context, the particle sizes can be determined by one or more of microscopy, x-ray line broadening, chemisorption, or small x-ray scattering. For example, one might measure the x-ray diffraction pattern of the catalysts, determine β the width of the diffraction line at some angle θ, and then calculate the particle size, D, from the Scherrer equation:

$$D = \frac{0.9\lambda}{\beta \cos(\theta)}$$

where λ is the wavelength of the x-ray beam.

Chemisorption can alternately be used to measure the Sg, the surface area of the active element per unit mass, and then calculate the particle size from the formula $$D = \frac{5}{S_g \rho}$$

where ρ is the bulk density of the active element.

The invention specifically includes any catalyst with a particle size between 0.6 nm and 100 nm measured by any of x-ray line broadening, chemisorption, or small x-ray scattering.

Example 1

An Illustration of the Effects of Particle Size on CO2 Conversion on a Silver/EMIM Catalyst Catalysts Tested This example illustrates the effect of silver particle size on the rate of $CO_2$ conversion on an EMIM-BF4 (Sigma Aldrich, St Louis Mo.) coated silver catalyst.

Experimental

During the experiments, a silver ink was deposited onto a silver rotating disk electrode (Pine Instruments, Grove City, Pa.). In the first experiment, the silver electrode was polished, and a CV was run as described in paragraph [0099] [0102] below. Subsequent experiments were run by depositing one of i) 200 nm silver (Sigma Aldrich, St Louis, Mo.) ii) 100 nm silver (Sigma Aldrich, St Louis, Mo.) iii) 20-40 nm silver (Sigma Aldrich, St Louis, Mo.) vi) 5 nm (UT Dots, Champaign Ill.) v) 0.67 nm (Purest Colloids, Westampton, N.J.) onto the silver electrode and running the CV as in the fourth paragraph below.

In the case of 500-1000 nm, 100 nm, 20-40 nm silver a silver ink is prepared by mixing 5.6 mg of silver particles with 1 ml deoxygenated Millipore water. The catalyst is applied on the surface of the rotating electrode by adding 60 μL of the ink to the surface and allowing the water to evaporate under ambient temperature for 60 minutes. In order to ensure the quality of the measurements, special attention is paid to the material cleaning and solution purity.

The 10 nm arrived suspended in an organic solution, and so this solution was applied to the silver electrode, and subsequently heated in air at 85° C. for 3 hours to remove any residual organics The 0.6 nm particles arrived suspended in distilled water, so they were used as received.

The counter electrode is made by attaching a 25×25 mm platinum mesh (size 52) to a 5 inch platinum wire (99.9%, 0.004 inch diameter). A silver quasi-reference electrode was used. The electrolytes were first loaded into the glass cell and then purged with dry argon (99.99%) for two hours in order to remove oxygen from the electrolytes. Prior to each experiment, a 20-40 linear sweep cyclic voltammogram at 75 mVs$^{-1}$ is taken with the range between −2 V and 0 vs. Ag-QRE in order to condition the electrodes and remove oxides from the surfaces. Then several cycles were performed at 10 mVs$^{-1}$ before taking the final cycle to insure that the CV had stabilized (that is, any "dirt" or other material is removed from the surfaces). Finally, cleaning and stabilizing CV cycles were performed at 10 mVs$^{-1}$. Then $CO_2$ was bubbled in the solution at 1 atm pressure for 20 minutes. Cyclic voltammetry was conducted again at a sweep rate of 10 mV/s in the range from −2 V to 0 V vs. Ag-QRE.

Results: Water Electrolysis

Figure 2:
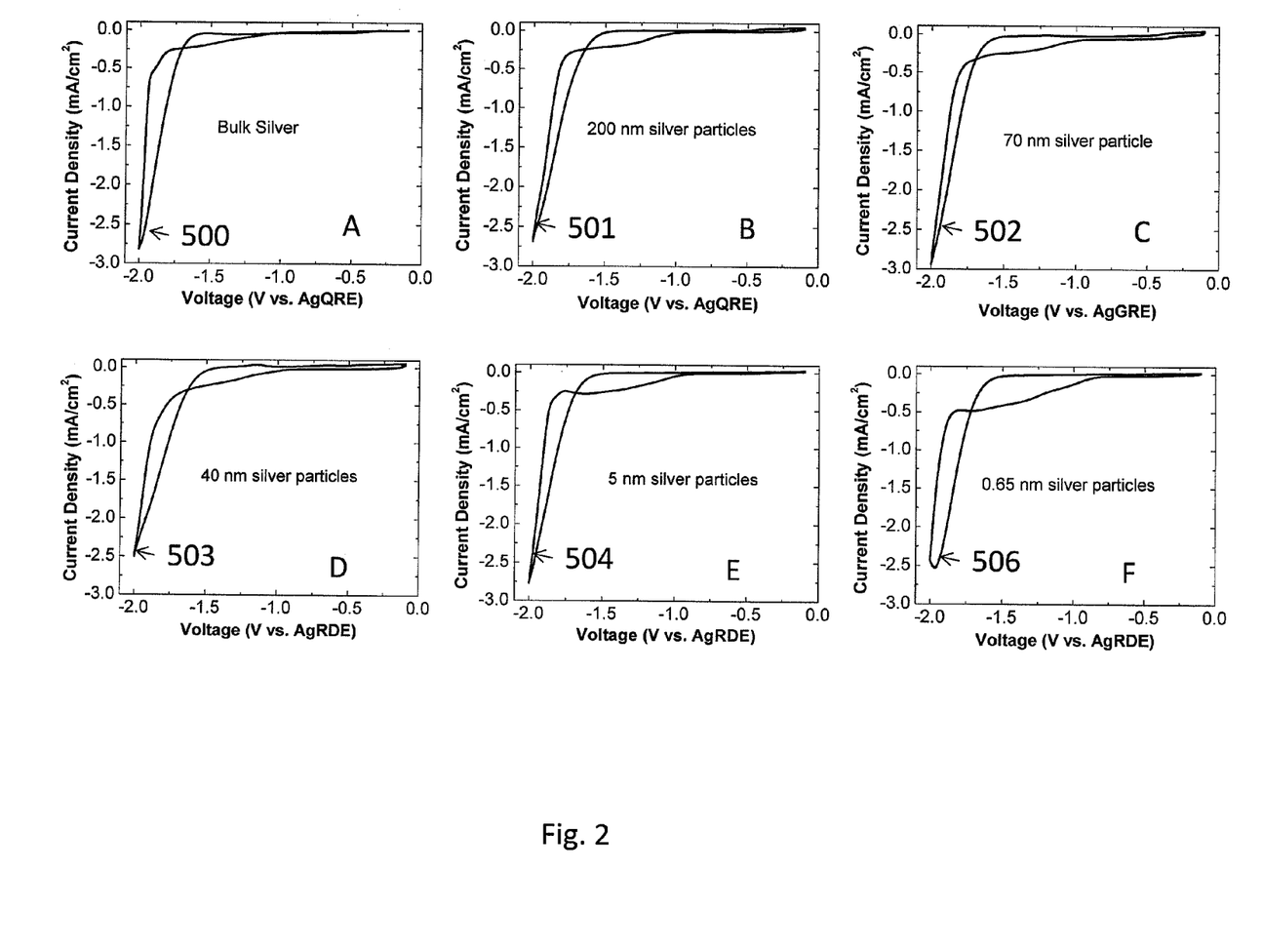
FIG. 2 illustrates how the cyclic voltammogram (CV) of electrochemical water reduction varies with the average particle size of the Catalytically Active Element silver on the cathode: (A) bare silver electrode, (B) electrode covered by nominally 200 nm silver particles, (C) electrode covered by nominally 100 nm silver particles, (D) electrode covered by nominally 20-40 nm silver particles, (E) electrode covered by 5 nm silver particles, and (F) electrode covered by 0.67 nm silver particles. The numeric designations 500-505 indicate the positions of the hydrogen peak in the figures. All of the CV's are reported as the current divided by the electrochemical surface area of the particles

FIG. 2 shows how the CV of water varies with particle size. One finds that there is very little variation in the catalytic activity of silver, in agreement with the literature reviewed in a recent paper, M. T. M. Koper, *Structural sensitivity and nanostructure effects in electrocatalysis*, Nanoscale 3, 2054 (2011) ("the Koper Paper")

Results: CO$_2$

Figure 3:
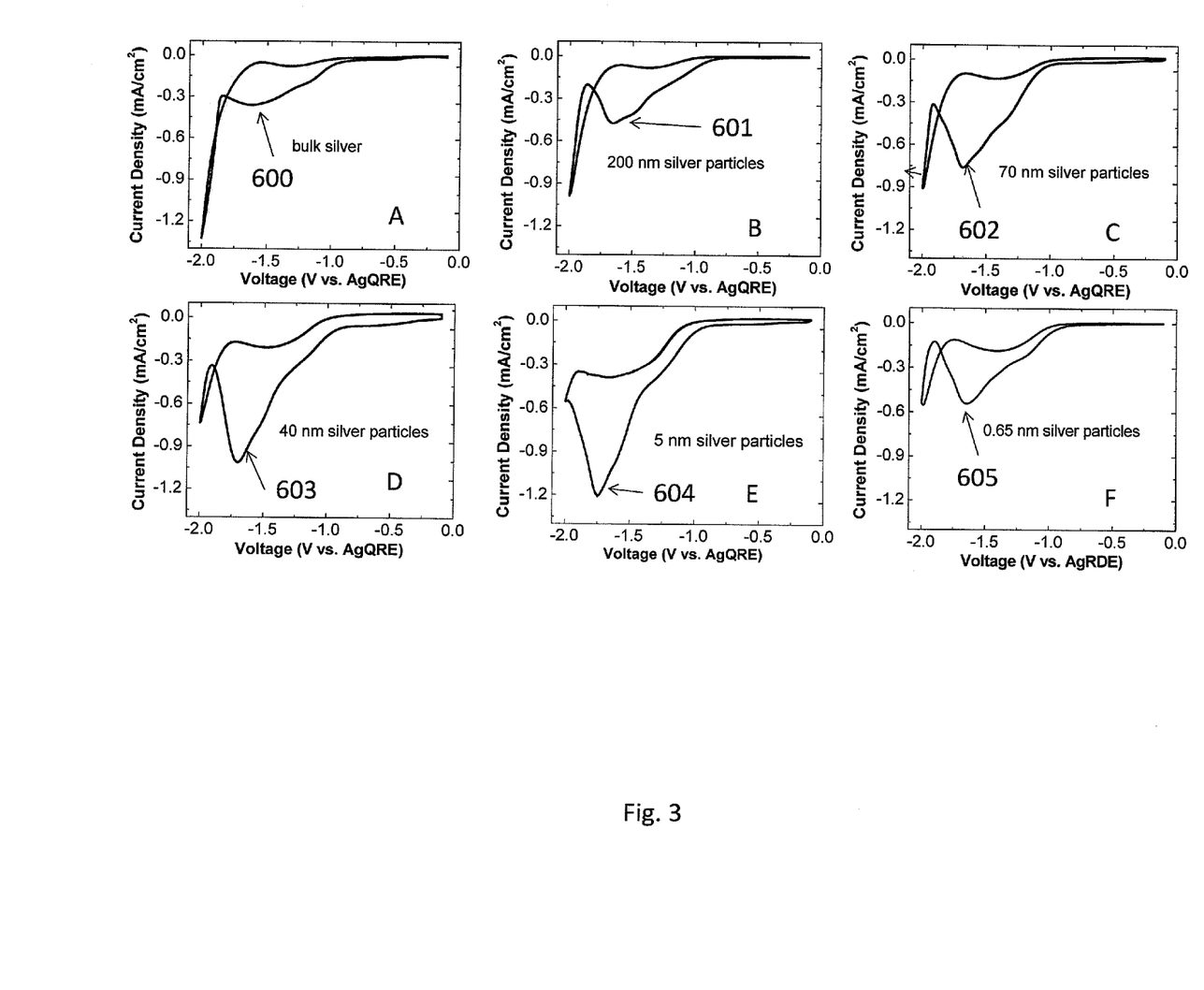
FIG. 3 illustrates how the CV changes in FIG. 2 when $CO_2$ is added to the reaction: (A) bare silver electrode, (B) electrode covered by nominally 200 nm silver particles, (C) electrode covered by nominally 100 nm silver particles, (D) electrode covered by nominally 20-40 nm silver particles, (E) electrode covered by 5 nm silver particles, and (F) electrode covered by 0.67 nm silver particles. The numeric designations 600-605 indicate the $CO_2$ reduction peak in the figures. All of the CV's are reported as the current divided by the electrochemical surface area of the particles
Figure 4:
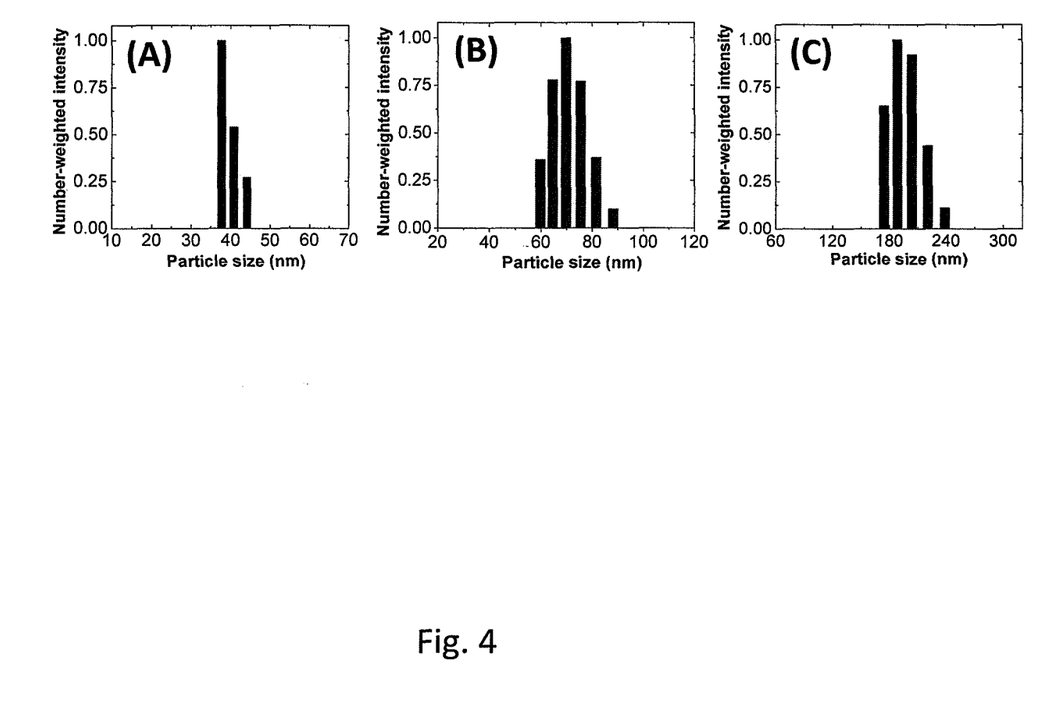
FIG. 4 illustrates particle size distribution of the (A) nominally 20-40 nm silver particles, (B) nominally 100 nm silver particles, and (C) nominally 200 nm silver particles as measured by dynamic light scattering. The nominally 20-40 nm particles have an average size of 35 nm. The nominally 100 nm particles have an average size of 70 nm and the nominally 200 nm particles have an average size of 190 nm.

FIG. 3 shows how the CV changes when CO$_2$ is added to the electrochemical cell. Notice that CO$_2$ conversion peaks, labeled 100, 101, 102, 103, 104, 105 and 106 are observed. The CO$_2$ conversion peaks grow as one decreases the particle size from 1000-10 nm, but then we observed the opposite effect, where the CO$_2$ peak shrinks moving from 10 nm to 0.6 nm. Evidently, there is an optimal particle size somewhere between 0.6 and 100 nm. The optimal size is probably between 0.6 and 40 nm, most probably between 0.6 and 20 nm.

The result above shows that unsupported silver catalysts have an optimal size between 0.6 and 100 nm. Those trained in the art know that if a reaction is structure sensitive on an unsupported catalyst, or single crystal, it will also show structure sensitivity on a supported catalyst. Further, the Korper Paper suggests that if a reaction is structure sensitive on one transition metal, it will also be structure sensitive on most other transition metals. In particular the optimum particle size is very similar on most transition metals. Therefore, we conclude that V, Cr, Mn, Fe, Co, Ni, Cu, Zr, Nb, Mo, Ru, Rh, Pd, Ag, Cd, W, Re, Ir, Pt, Au, Hg, Pb, Bi, electrocatalysts for CO$_2$ conversion should have an optimal size between 0.6 and 100 nm.

The examples given above are merely illustrative and are not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

The disclosures of all references and publications cited above are expressly incorporated by reference in their entireties to the same extent as if each were incorporated by reference individually.

What is claimed is:

1. A process for making a chemical reaction product, comprising:

combining a Catalytically Active Element and Helper Catalyst in the presence of CO$_2$, wherein the Catalytically Active Element is a metal in the form of supported or unsupported particles or flakes with an average size between 0.6 nm and 100 nm;

allowing a reaction to proceed to produce a reaction product; and applying electrical energy to said reaction to achieve electrochemical conversion of said reactant to said reaction product;

wherein a substance S is identifiable as a Helper Catalyst for an electrochemical reaction R that is catalyzed by a Catalytically Active Element M by applying a test comprising:

filling a three-electrode electrochemical cell with an electrolyte E suitable for effectuating reaction R, said electrochemical cell comprising a working electrode, a counter electrode and a reference electrode;

electrically connecting said Catalytically Active Element M to said working electrode and electrically connecting said working electrode to said counter electrode and to a source of electrical energy, thereby forming an electrical circuit;

employing said reference electrode to measure a reversible hydrogen electrode (RHE) potential in said electrolyte E;

loading at least one reactant for reaction R into said cell;

measuring a cyclic voltammogram for reaction R to identify a potential of a peak associated with reaction R;

calculating a difference V1 between RHE and an onset potential of said peak associated with reaction R;

calculating a difference V1A between RHE and a maximum potential of said peak associated with reaction R;

adding to said electrolyte E between 0.0001% and 99.9999% by weight of said Helper Catalyst;

measuring an RHE potential in electrolyte E with said added Helper Catalyst;

measuring a cyclic voltammogram of reaction R with said added Helper Catalyst;

calculating a difference V2 between RHE and an onset potential of said peak associated with reaction R;

calculating a difference V2A between RHE and a maximum potential of said peak associated with reaction R;

determining whether V2<V1 or V2A<V1A at any concentration of said Helper Catalyst between 0.0001% and 99.9999%; and identifying substance S as said Helper Catalyst for reaction R at concentrations at which V2<V1 or V2A<V1A.

2. The process of claim 1 wherein said Catalytically Active Element is selected from the group consisting of V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, and Nd.

3. The process of claim 2 wherein said Catalytically Active Element is selected from the group consisting of Pt, Pd, Au, Ag, Cu, Ni, Fe, Co, Ru and Rh.

4. The process of claim 1 wherein said Helper Catalyst comprises at least one of an organic cation and an organic anion.

5. The process of claim 1 wherein said Helper Catalyst is selected from the group consisting of phosphines, imidazoliums, pyridiniums, pyrrolidiniums, phosphoniums, sulfoniums, prolinates, methioninates, cholines, choline chloride, choline bromide, and choline iodide.

6. The process of claim 1 wherein the reaction products comprise at least one of CO, HCO$^-$, H$_2$CO, (HCO$_2$)$^-$, H$_2$CO$_2$, CH$_3$OH, CH$_4$, C$_2$H$_4$, CH$_3$CH$_2$OH, CH$_3$COO$^-$, CH$_3$COOH, C$_2$H$_6$, (COOH)$_2$, (COO$^-$)$_2$, and CF$_3$COOH.

7. The process of claim 6 wherein said reaction product is one of formic acid (H$_2$CO$_2$) and carbon monoxide (CO).

8. The process of claim 1, wherein the Catalytically Active Element is electrically connected to an electrode of an electrochemical device.

* * * * *